(12) United States Patent
Terry et al.

(10) Patent No.: US 6,614,861 B1
(45) Date of Patent: Sep. 2, 2003

(54) METHOD AND APPARATUS FOR HIGHER DIMENSIONAL MODULATION

(75) Inventors: John Terry, Garland, TX (US); Steven D. Gray, Dallas, TX (US)

(73) Assignee: Nokia Networks Oy (FI)

( * ) Notice: Subject to any disclaimer, the term of this patent is extended or adjusted under 35 U.S.C. 154(b) by 0 days.

(21) Appl. No.: 09/474,497

(22) Filed: Dec. 29, 1999

Related U.S. Application Data

(60) Provisional application No. 60/129,606, filed on Apr. 16, 1999.

(51) Int. Cl.$^7$ .............................. H04B 7/10; H04L 1/02
(52) U.S. Cl. ........................................ 375/347; 375/267
(58) Field of Search ................................ 375/240–296, 375/235

(56) References Cited

U.S. PATENT DOCUMENTS

| | | | | |
|---|---|---|---|---|
| 5,150,381 A | * | 9/1992 | Forney et al. ............... | 375/261 |
| 5,809,060 A | * | 9/1998 | Cafarella et al. ............ | 375/146 |
| 5,832,044 A | * | 11/1998 | Sousa et al. ................. | 375/347 |
| 5,898,737 A | * | 4/1999 | Chethik et al. .............. | 375/235 |
| 5,966,412 A | * | 10/1999 | Ramaswamy ................ | 375/341 |
| 6,115,427 A | * | 9/2000 | Calderbank et al. ......... | 375/267 |
| 6,246,698 B1 | * | 6/2001 | Kumar ......................... | 427/282 |
| 6,282,168 B1 | * | 8/2001 | Vijayan et al. .............. | 370/203 |
| 6,473,878 B1 | * | 10/2002 | Wei .............................. | 714/755 |

OTHER PUBLICATIONS

Calderbank, A.R. and Ozarow, L.H., Jul. 1990, "Non–equiprobable Signaling on the Gaussian Channel", IEE Transaction on Information Theory, vol. 36, No. 4, p. 726–740.*

E. Biglieri, D. Divsalar, P. J. McLane, and M. K. Simon, *Introduction to Trellis Coded Modulation With Applications.* New York: Macmillan, 1991.

S. H. Jamali and T. Le–Ngoc, "Coded–Modulation Techniques for Fading Channels." Kluwer Academic Publishers. 1994.

G. Taricco, E. Biglieri, and V. Castellani, "Applicability of four–dimensional modulations to digital satellites: A simulation study." IEEE, pp. 28–34, Torino, Italy, 1993.

V. Acha and R. A. Karrasco, "A New Digital Implementation of Quadrature–Quadrature Phase Shift Keying,", pp. 29–34, Staffordshire Polytechnic, UK.

D. Saha, "Channel Coding with Quadrature–Quadrature Phase Shift–Keying ($Q^2PSK$) Signals," *IEEE Trans. Commun.*, vol. 38, No. 4, pp. 409–417, Apr. 1990.

V. Tarokh, N. Seshadri, and A. R. Calderbank, "Space–Time Codes for High Data Rate Wireless Communication: Performance Criterion and Code Construction," *IEEE Trans. Inform. Theory*, vol. 44, No. 2, pp. 744–765, Mar. 1998.

* cited by examiner

*Primary Examiner*—Stephen Chin
*Assistant Examiner*—Lawrence Williams
(74) *Attorney, Agent, or Firm*—Banner & Witcoff, Ltd.

(57) ABSTRACT

An M-ary signal constellation within an N-dimensional space is defined, preferably such that each of the M symbols reside upon the surface of an N-dimensional sphere and such that a minimum distance between symbols is maximized. N orthogonal functions are used as the bases for representing the N-dimensional symbols for transmission. Orthogonal functions exhibiting orthogonality in frequency, time and/or space are also described for this purpose. Furthermore, conventional QAM symbol encoding may be used to represent the N-dimensional symbols, thereby facilitating the use of conventional modulation techniques. In this manner, higher dimensional modulation schemes may be realized.

43 Claims, 6 Drawing Sheets

| $t_{0,1}$ | $t_{0,2}$ | $t_{0,3}$ | $t_{0,4}$ | $t_{0,5}$ | $t_{0,6}$ | $t_{0,7}$ | $t_{0,8}$ | FRAME 0 |
|---|---|---|---|---|---|---|---|---|
| $t_{1,1}$ | $t_{1,2}$ | $t_{1,3}$ | $t_{1,4}$ | $t_{1,5}$ | $t_{1,6}$ | $t_{1,7}$ | $t_{1,8}$ | FRAME 1 |

⋮

| $t_{N-1,1}$ | $t_{N-1,2}$ | $t_{N-1,3}$ | $t_{N-1,4}$ | $t_{N-1,5}$ | $t_{N-1,6}$ | $t_{N-1,7}$ | $t_{N-1,8}$ | FRAME N-1 |

METHOD AND APPARATUS FOR HIGHER DIMENSIONAL MODULATION

CROSS REFERENCE TO RELATED APPLICATION

This application claims the benefit of U.S. Provisional Patent Application Serial No. 60/129,606, filed on Apr. 16, 1999.

TECHNICAL FIELD

The present invention relates generally to communication systems (for example, wireless communication systems) and, in particular, to a method and apparatus for higher dimensional modulation to provide more effective communications.

BACKGROUND OF THE INVENTION

Space-time coding (STC) is well known in the art. In an STC encoder, binary valued symbols (i.e., binary valued symbols $b_i \in [0,1]$) are encoded such that code words are drawn from an M-ary alphabet (i.e., $s_i \in [c_0, c_1, \ldots c_{M-1}]$) and transmitted on multiple antennas. Assuming that the channels between each transmit antenna and receiver experiences independent flat fading, the spatial diversity provided by the multiple antenna improves the likelihood of correctly receiving the transmitted data using diversity reception techniques. An exemplary STC [coder] system 100 is illustrated in FIG. 1.

A binary valued data source 102 is channel coded 104 and/or interleaved based upon the performance requirements of the communication system under consideration. Channel coding and interleaving provides a measure of protection against corruption of the data during transmission over an imperfect channel. The output of conventional channel coding is then passed to the STC encoder 106. The example shown in FIG. 1 comprises two constitutive convolutional encoders, although other types of encoders may be used. As known in the art, the STC encoder 106 introduces structured memory to the data thereby improving its robustness to induced errors. The binary valued outputs 114, 116 are passed to a symbol encoder 108 that produces M-ary symbols for each of the two transmit antennas 110, 112. That is, groups of $\log_2(M)$ of the binary outputs 114, 116 are mapped into ones if M possible symbols. One important characteristic of the prior art STC [coder] system 100 is that the codewords $[c_0, \ldots c_{M-2}, c_{M-1}]$ representing the M possible symbols are defined relative to a two-dimensional basis vector, (I,Q). This is illustrated in FIG. 2 where the points in the signal constellation 200 are for 16-QAM, and each point $c_j$ for j=0 to M−1 corresponds to a four-bit word.

Because the distance between codewords governs error rate performance, in part, it is desirable to maximize the distance between codewords. One important metric used in quantifying performance in wireless communications systems is the minimum distance between codewords, $d_{min}$. It has been shown that the error rate for data transmitted in this manner is proportional to $d_{min}$. One way to increase $d_{min}$ is to increase the number of dimensions over which the M possible symbols are defined. For example, assuming a signal constellation in which M=4 defined on a unit circle within a two-dimensional (I, Q) plane, it can be shown that the minimum squared distance between the symbols is 2. However, by defining the same four symbols on a unit sphere within a three-dimensional space, the minimum squared distance can be increased to 2.66, thereby resulting in a 1.23 decibel (dB) improvement in performance.

Although the concept of higher dimensional modulation schemes (e.g., lattice codes and spherical codes) have been around for quite some time, their application has been limited to analyzing the performances of channel coding schemes. Designers have been hesitant to directly implement these higher dimensional modulation schemes for fear that they would require a radical change in conventional modulation and demodulation design. Other authors have attempted to use codes constructed using cosets and lattices built up using multiple transmissions of two-dimensional constellations such as multiple phase shift keying (MPSK) and multiple quadrature amplitude modulation (MQAM). Lattice codes constructed in such a fashion have been termed product codes as they are constructed by a Cartesian product of L two-dimensional signals. The popularity of these multidimensional codes can be attributed to their inherent capability to perform set partitioning and branch labeling in multidimensions by performing each in two dimensions for all constituent pairs of coordinates. One drawback of these codes, which is common to all MQAM signaling schemes, is the very large peak to average power ratio (PAPR) for the transmitted symbols. A large PAPR requires the input signal power to the transmit amplifier to be backed off from its saturation level and, thus, resulting in poor DC power efficiency for the transmitter. For two-dimensional signals, M-PSK signals are used to lower the PAPR. The multidimensional analogy is to use signal points that lie on an N-dimensional sphere. Another disadvantage of product codes is that they do not always achieve (or approach) the Levinstein's bound in minimum squared distance. The main reason is that the symbols are forced to fall off a lattice structure that may not be optimum depending on the constellation size M and number of dimensions N. Furthermore, since the codes are built up from smaller two-dimensional signals, there are only a finite number of allowable coordinates in each dimension.

Thus, a need exists for techniques whereby higher dimensional modulation is achieved in any number of allowable coordinate sets and dimensions greater than two to improve system performance.

SUMMARY OF THE INVENTION

The present invention provides a method and apparatus for providing N-dimensional modulation, where N is greater than two. This is achieved by first defining an M-ary signal constellation within an N-dimensional space. In a preferred embodiment, each of the M symbols from this constellation are defined such that they each reside upon the surface of an N-dimensional sphere and such that the minimum distance between symbols is maximized. N orthogonal functions are then used as the bases for representing the N-dimensional symbols for transmission. For example, the orthogonal sub-carriers within an orthogonal frequency division multiplexing system may be used for this purpose. Further examples of orthogonal functions possessing orthogonality in time and space are also described for this purpose. In one embodiment of the present invention, conventional quadrature amplitude modulation symbol encoding may be used to represent the N-dimensional symbols, thereby facilitating the use of conventional modulation techniques. Using these techniques, the present invention is capable of improving the overall performance of space-time coding systems.

DETAILED DESCRIPTION OF THE PREFERRED EMBODIMENT

Figure 1:
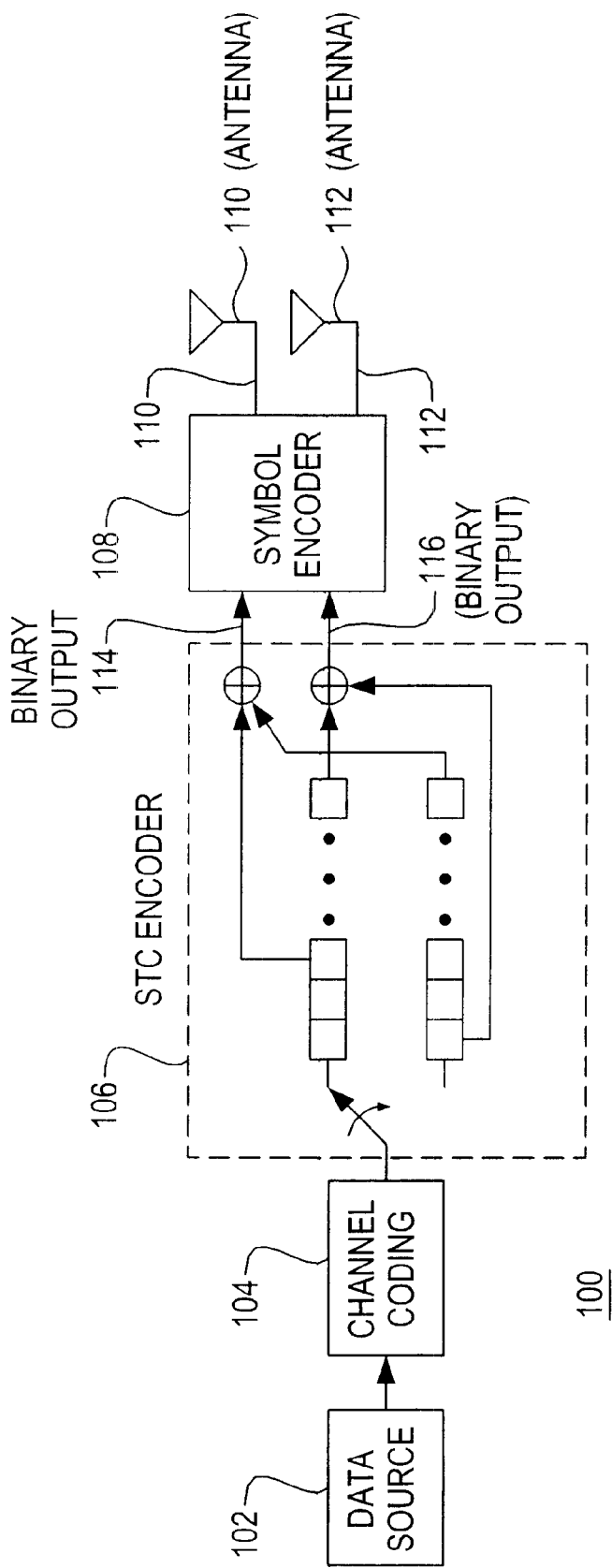
FIG. 1 is a block diagram of an exemplary space time coder in accordance with prior art techniques.
Figure 2:
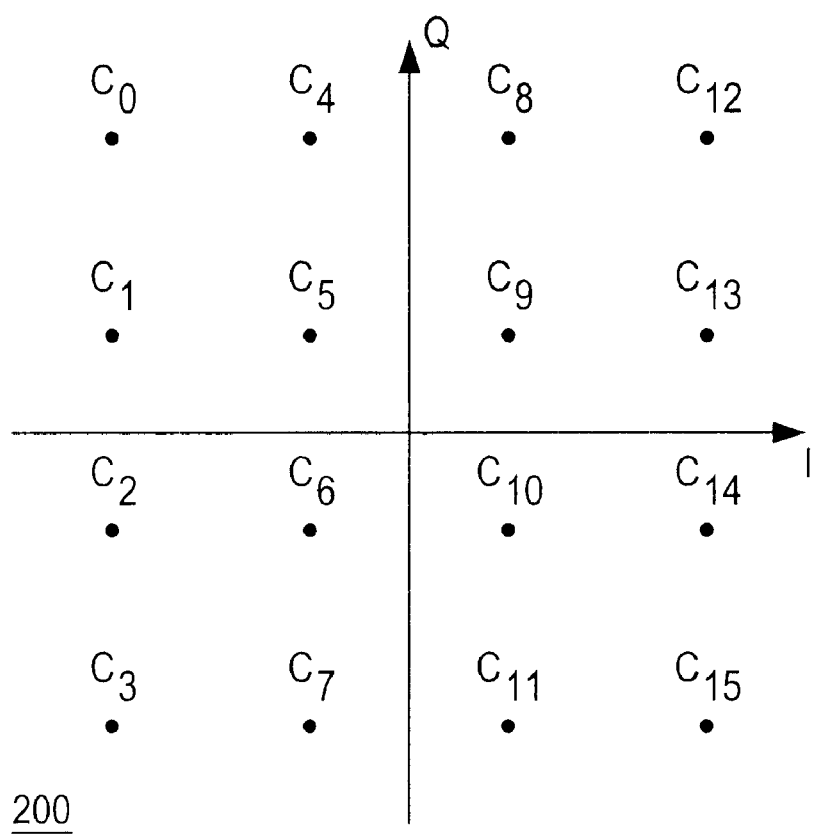
FIG. 2 illustrates an exemplary signal constellation of the type that may be used in the space time coder of FIG. 1.
Figure 3:
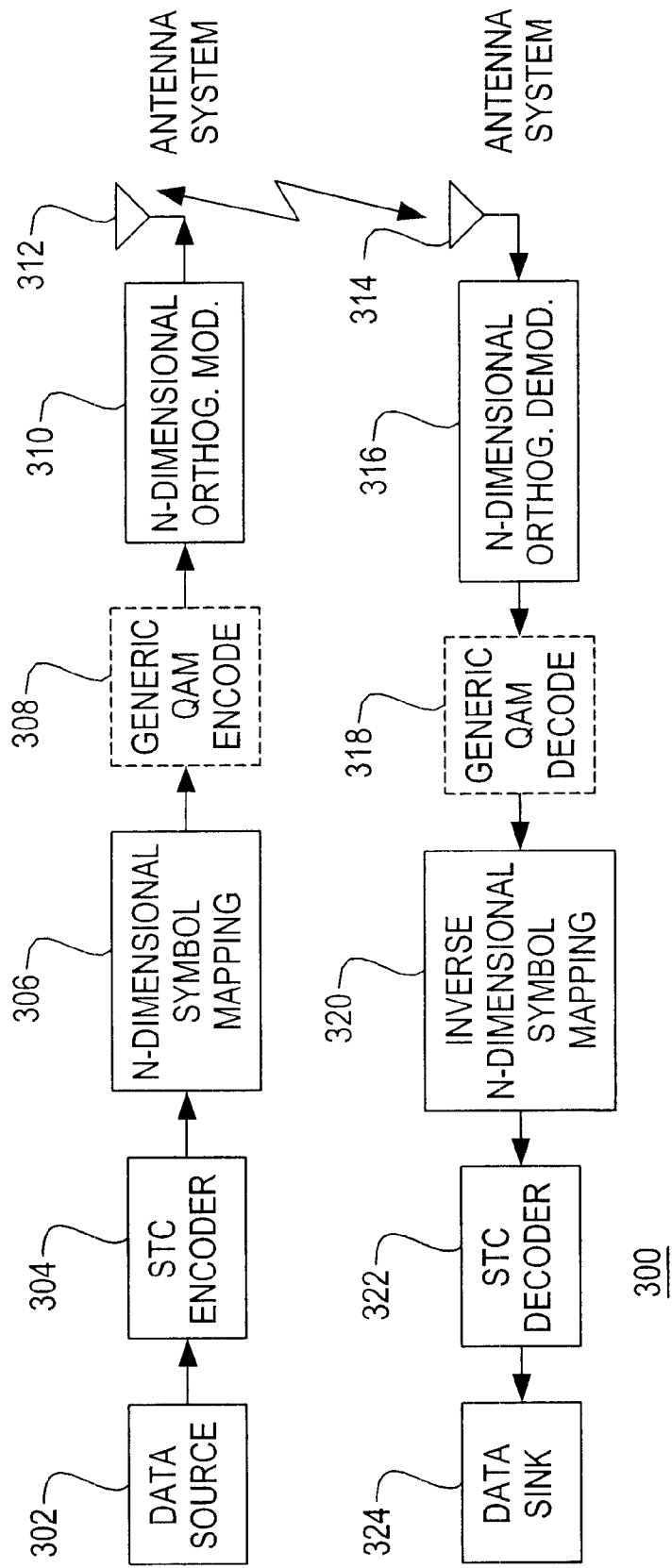
FIG. 3 is a block diagram of a system for providing communications using higher dimensional modulation in accordance with the present invention.

The present invention may be more fully described with reference to FIGS. 3–7. A communication system 300 is illustrated in FIG. 3. The system 300 comprises a transmit side and a receive side, as shown. On the transmit side, a data source 302 provides data, preferably in a binary form. For the purposes of the present invention, the data provided by the data source 302 may comprise virtually anything capable of being represented in a binary format and includes, but is not limited to, voice and image data. The communication system 300 may be, for example, a cellular telephone system in which the transmit side is embodied within a cell phone or other type of subscriber radio unit, and the receive side is embodied within a base station or other fixed receiving equipment, or vice versa. Further still, the transmit side and the receive side may be embodied within separate subscriber units, respectively, or within separate base stations, respectively. Of course, the present invention may be beneficially applied to other types of communication systems, particularly wireless communication systems.

The data is provided to an STC encoder 304 that may be more generally referred to a structured memory encoder. Encoding the data such that the sequence of the values present in the encoded data is itself representative of the original data typically provides such structured memory. Examples of such structured memory encoders are convolutional or so-called turbo encoders. Other types of encoders, such as block encoders, may also be used. Regardless, the output of the encoder 304 comprises information preferably represented in a binary format.

The information output by the encoder 304 is then provided to an N-dimensional symbol mapping function 306. To this end, a signal constellation comprising M possible symbols is defined within an N-dimensional space. Any point within the N-dimensional space may be thought of as the vector sum of N scaled basis vectors. The respective amplitudes of the N basis vectors used to define a particular point may be thought of as N-dimensional coordinates. Thus, each of the M possible symbols may be respectively defined in terms of N coordinates $(\alpha_0, \alpha_1, \ldots \alpha_{N-1})$, often referred to as an N-tuple. In order to achieve the desired mapping, groups of $\log_2$ (M) of the binary values (bits) output by the encoder are used to select respective ones of the M possible symbols, each such symbol represented by a corresponding N-tuple. In practice, the mapping can be achieved using a lookup table in which the groups of $\log_2$ (M) binary values are an index into a table comprising the required N-tuple values.

Of course, there are an infinite number of ways to arrange M points (symbols) within an N-dimensional space. In a preferred embodiment, the M symbols defined within the signal constellation are restricted to lie upon the surface of an N-dimensional sphere. In a practical sense, this will cause all of the symbols to be transmitted with the same average transmit power. Further still, it is preferred that the M symbols residing on the N-dimensional sphere be distributed thereon such that the minimum distance between any two of the symbols is maximized. By maximizing the minimum distance between symbols in this manner, the overall performance of the modulation scheme is commensurately maximized.

The N-tuples output by the mapping function 306 may be then applied directly to an N-dimensional orthogonal modulator 310 for transmission via an antenna system 312. If transmitted in this manner, each coordinate of a given N-tuple is used to directly modulate a corresponding one of N orthogonal functions. In practice, the antenna system 312 may comprise multiple antennas such that diversity gain techniques may be applied. As will become apparent from the discussion below, other techniques may be employed such the diversity gains may be exploited.

In one embodiment of the present invention, generic QAM encoding 308 is first applied to each N-tuple. That is, for each N-tuple $(\alpha_0, \alpha_1, \ldots \alpha_{N-1})$, corresponding QAM symbols $c_j$ are defined according to Equation 1:

$$c_j = \alpha_{2j} + i \cdot \alpha_{2j+1} \tag{1}$$

Thus, the real and complex components of each QAM symbol are successive components from a given N-tuple. Of course, the present invention is not restricted to using only successive N-tuple components when forming the QAM symbols; other combinations of coordinates may also be readily used as a matter of design choice. In a preferred embodiment, N has a value such that an integer number of QAM symbols may be used to represent a given N-tuple, i.e., N is evenly divisible by two.

The design criterion for STC on fading channels is derived from the upper bound on the pairwise error probability, i.e., the probability that one symbol will be received in error as another symbol. It has been shown, for high signal-to-noise ratios (SNR) and perfect channel state information (CSI) over a memoryless fading channel, that the performances of trellis coded modulation and STC are dominated by the inverse of the product distance, as shown in Equation 2:

$$P(c \to e) \leq \prod_{i \in \eta} \frac{(1+K)e^{-K}}{|c_i - e_i|^2 \cdot 1/4N_0} \tag{2}$$

In Equation 2, K is the Rician factor defined as the ratio of the energy of the direct component to the energy of the diffuse multipath components, and $\eta$ is a of set of low Hamming weight codewords of all i for which $c_i \neq e_i$. For Rayleigh distributed channels, K is equal to zero and the numerator of the expression in Equation 2 simplifies to unity. Thus, there are two ways of decreasing the pairwise error probability: one is to increase the smallest effective length—the number of elements in $\eta$ and denoted as $l_\eta$. The second is to increase the minimum distance amongst all pairs of codewords (c, e), i.e., increase $d_{min}$. As described above, defining M symbols within an N-dimensional space can increase $d_{min}$. If the number of orthogonal functions available for use in transmitting the QAM symbols is greater than N (preferably an integer multiple of N), then multiple channels may be defined such that the effective length $l_\eta$ is increased, thereby further minimizing the pairwise error probability.

The receive side of the system 300 implements the reverse functions with respect to the transmit side. An antenna system 314 receives the transmitted information. In one embodiment of the present invention, the antenna system 314 employs diversity reception techniques as known in the art. The transmitted information is routed to an N-dimensional orthogonal demodulator 316 that demodulates the transmitted information based upon the N orthogonal functions used in the modulator 310. Again, various techniques may be used to implement the N orthogonal functions, as described in detail below. The output of the demodulator 316 is at least one received symbol drawn from the M-ary, N-dimensional signal constellation used on the transmit side.

In one embodiment, the at least one received symbol may be routed directly to an inverse N-dimensional symbol mapping block 320. The inverse mapping 320 takes as input a given symbol from the signal constellation and translates it into a group of $\log_2(M)$ binary values suitable for input to the STC decoder 322. As before, the inverse mapping 320 may be carried out using a lookup table. The groups of binary values output by the inverse mapping 320 preferably incorporate structured memory, as described above. The STC decoder 322, in turn, exploits and removes the structured memory to provide received data to a suitable data sink 324, which received data is optimally free of errors. The operations performed by STC decoder 322 are the inverse operations of the STC encoder 304 and depend on the particular type of encoding used. For example, where convolutional encoding is used, the present invention preferably incorporates a Viterbi decoder. Likewise, where block encoding is used, a block decoder is employed.

As described above, the present invention incorporates the use of N orthogonal functions to directly implement higher dimensional modulation schemes. Various methods for implementing these N orthogonal functions are described below with regard to FIGS. 4–7.

Figure 4:
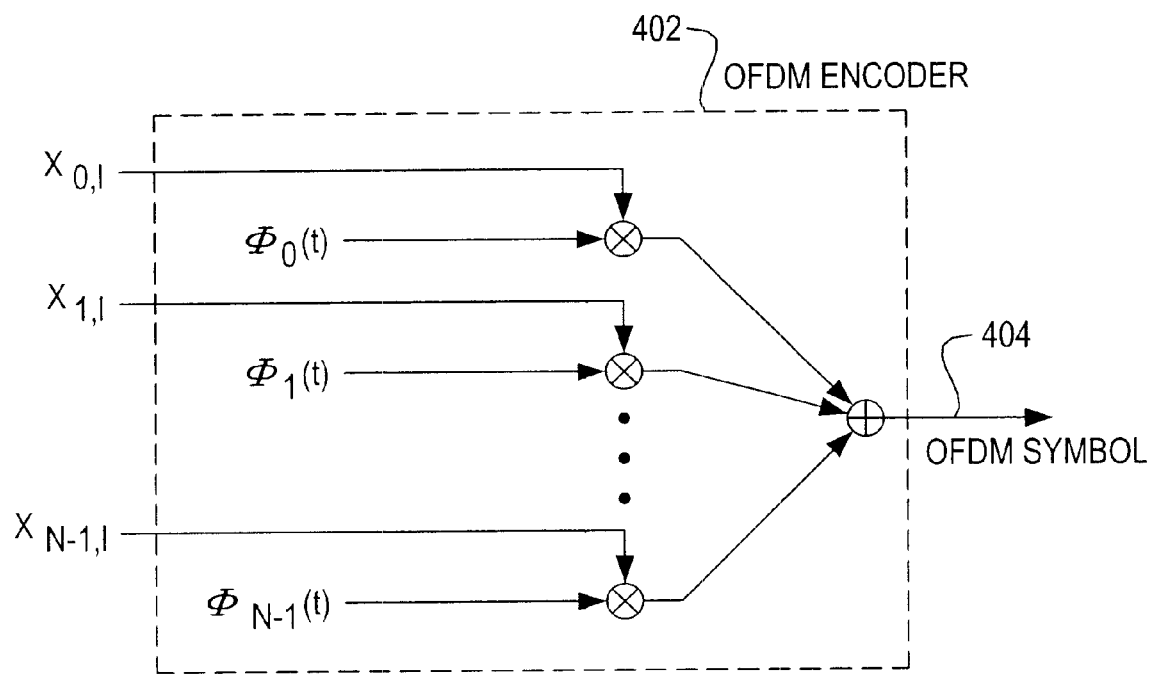
FIG. 4 illustrates a conceptualized representation of an orthogonal frequency division multiplexing symbol encoder.

FIG. 4 illustrates a conceptualized representation of an orthogonal frequency division multiplexing (OFDM) encoder 402. A plurality of orthogonal subcarriers $\Phi_n(t)$ can be thought of as sinusoids or complex exponentials of the form $e^{j2\pi(W/N)nt}$ for $t \in [0, T]$ where W is the available frequency bandwidth and W/N expresses the frequency spacing between subcarriers. As used throughout, orthogonal functions form a linearly independent set (i.e., the individual functions are not dependent on each other) that completely define a given N-dimensional space. Expressed another way, orthogonality results where the cross correlation of respective pairs of functions is zero over a given time interval. Because of the orthogonality of the subcarriers $\Phi_n(t)$, the output OFDM symbol 404 is the sum of the modulated orthogonal carriers, which carriers employ relatively close frequency spacings.

Figure 5:
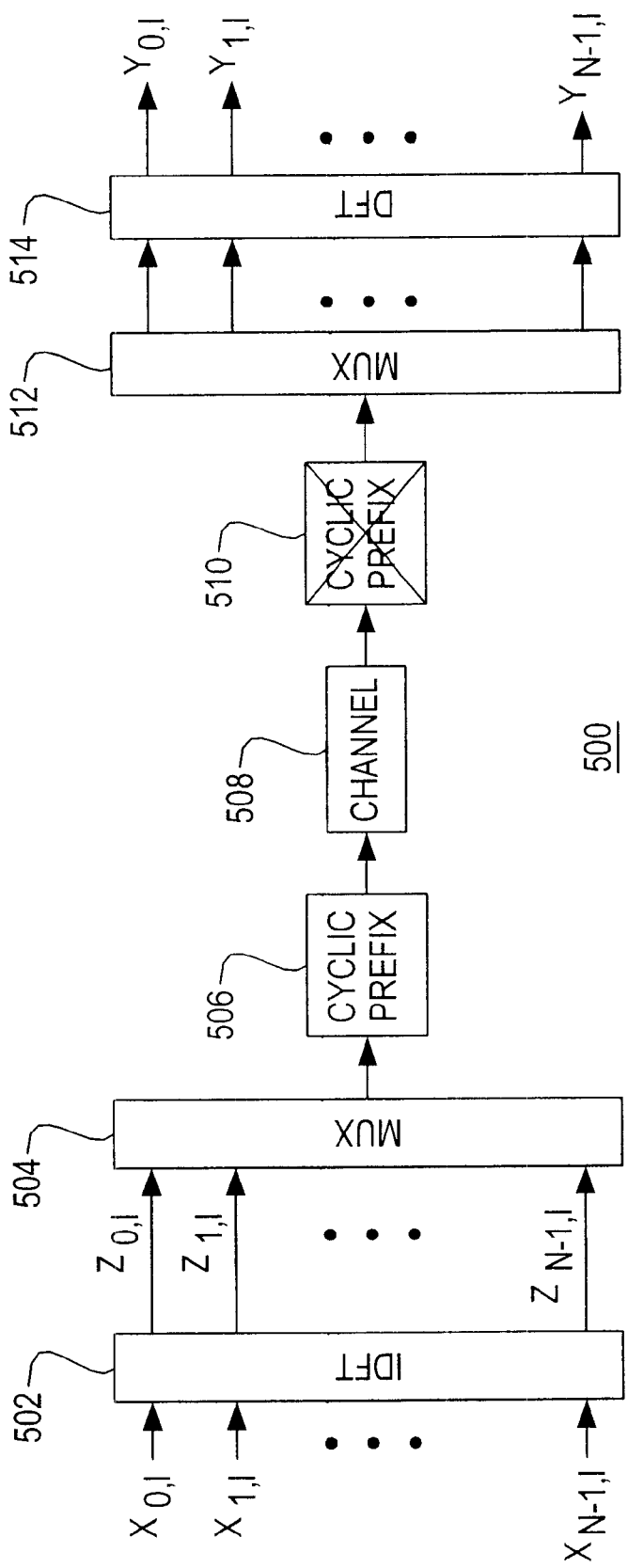
FIG. 5 is a block diagram of an orthogonal frequency division multiplexing system that may be incorporated into the system of FIG. 3 to provide higher dimensional orthogonal functions.

As known in OFDM systems, the functionality represented by the OFDM encoder 402 may be replaced with an inverse discrete Fourier transform (IDFT) to more efficiently implement the encoder. Such an implementation, suitable for use in the present invention, is illustrated in FIG. 5. In particular, the OFDM system 500 shown comprises an encoder portion comprising elements 502–506, and a decoder portion comprising elements 510–514. Relative to FIG. 3, the elements 502–506 constituting the encoder portion would be incorporated into the N-dimensional orthogonal modulator 310, whereas the elements 510–514 constituting the decoder portion would be incorporated into the N-dimensional orthogonal demodulator 316.

A series of input bits or symbols $[x_{0,l}, x_{1,l}, \ldots x_{N-1,l}]$ corresponding to the l'th OFDM symbol to be generated are provided as input to an IDFT block 502. The symbol outputs of the IDFT $z_l[k]$ are the summation of the subcarriers $\Phi_{n,l}$ (where the variable k is used to denote discrete time) scaled by their respective inputs $x_{n,l}$. In this manner, the subcarriers act as N orthogonal functions representing an N-dimensional space. The multiplexer 504 converts the IDFT output symbol from parallel to serial form and provides the serial stream as input to a cyclic prefix function 506. As known in the art, the cyclic prefix function 506 essentially guarantees the orthogonality of the OFDM symbols by appending the last $T_g$ seconds of each OFDM symbol as a prefix to itself, where $T_g$ is chosen to be longer than the impulse response of the channel 508. Although not shown, the OFDM symbols are used to modulate a suitable carrier for transmission via the channel 508. In effect, the prefix allows the received OFDM symbols to appear to be a cyclic convolution of the signal representing the OFDM symbol with the impulse response of the channel 508.

In the decoder portion, a cyclic prefix removal block 510 represents the fact that the cyclic prefixes are not considered a part of the actual OFDM symbols transmitted. In practice, the cyclic prefix allows the receiver to treat the convolution of the channel impulse response with the transmitted signal as a circular convolution, thereby simplifying inverse processing. Received OFDM symbols (extracted from the carrier used to transmit the OFDM symbols from the encoder portion) are provided to a de-multiplexer 512 which converts the received OFDM symbols from serial to parallel form. In turn, the DFT 514 performs the inverse operation of the IDFT 502, extracting estimates $y_{n,l}$ of the transmitted inputs $x_{n,l}$.

As described above, it is possible to incorporate generic QAM encode and decode operations when transmitting the N-dimensional symbols. The QAM symbols are formed using the coordinates from an N-tuple corresponding to a symbol to be transmitted. By allocating the coordinates for a particular symbol across independent fading channels (i.e., different channels formed by groups of N orthogonal functions), one effectively performs a block interleaving of the coordinates. It is well known that a block interleaver of depth L provides an L-fold diversity advantage for fading channels. In other words, by choosing groups of N orthogonal functions whose linear independence are assured by separation in, e.g., frequency, time and space, then one increases the effective length of the code. For example, consider a 16-ary modulation implemented in four dimensions and transmitted in an OFDM system as shown in FIG. 5 and assuming 48 subcarriers. The best possible interleaving would be to separate each coordinate of a transmitted symbol by 12 carriers since only 48 subcarriers are used in transmission of data. Hence, the modulation symbols $x_p$ for the pth subcarriers are formed as:

$$\begin{bmatrix} x_0 \\ x_1 \\ \vdots \\ x_p \end{bmatrix} = \begin{bmatrix} \alpha_{0,0} + i \cdot \alpha_{0,1} \\ \alpha_{0,2} + i \cdot \alpha_{0,3} \\ \vdots \\ \alpha_{(p+1) \bmod 12, 0} + i \cdot \alpha_{(p+1) \bmod 12, 1} \end{bmatrix} \quad (3)$$

where the first index of $a$ indicates the coordinate axis, and the second, the data symbol interval.

Figures 6, 7:
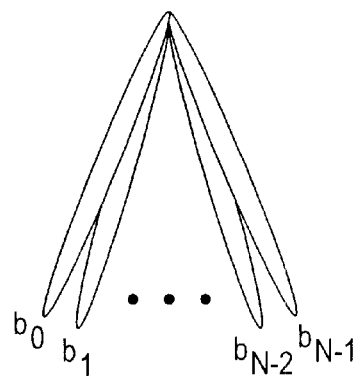
FIG. 6 illustrates an alternative means for providing higher dimensional orthogonal functions.
FIG. 7 illustrates yet another alternative means for providing higher dimensional orthogonal functions.

The OFDM systems described above are examples in which the orthogonality of the N orthogonal functions results from the differences in frequency between the subcarriers. However, characteristics other than frequency may be used to ensure orthogonality, as illustrated in FIGS. 6 and 7. FIG. 6 illustrates time slots as would be used in a time division multiplexing (TDM) system in which orthogonality exists in time. That is, there are N possible frames each comprising, in this example, eight time slots. Thus, the k'th time slot in the n'th frame is denoted as $t_{n,k}$. Orthogonal functions within such a system would be represented by time slots that are independent in time of each other. For example, three time slots within a single frame, e.g., $t_{0,1}$, $t_{0,3}$ and $t_{0,5}$, may be used as the bases for a 3-dimensional representation. Alternatively, three time slots occurring in different frames and still independent of each other, e.g., $t_{1,1}$, $t_{3,2}$ and $t_{5,3}$, may also be used.

FIG. 7 illustrates orthogonal beams $[b_0, \ldots b_{N-1}]$ that may also serve as the N orthogonal functions. As known in the art, beam forming techniques may be used such that several spatially independent beams are transmitted by an antenna system. The present invention exploits this spatial independence in order to provide the required N orthogonal functions. Other systems beyond those illustrated in FIGS. 6 and 7 may also be used. For example, in code division multiplexing (CDM) systems, a unique signature or spreading sequence is used to separate data transmission between a base station and a mobile radio. These systems rely on the orthogonality of the spreading sequences to be able to discriminate between various transmissions simultaneously made over the same frequency band. In various CDM systems, different types of data bearing channels may use, depending upon the type of service, a different orthogonal spreading sequence on the downlink. The orthogonality of the spreading sequences may be exploited to obtain the N orthogonal functions within CDM systems.

The present invention as described above provides a unique method and apparatus for providing higher dimensional modulation schemes. Using N functions exhibiting orthogonality in frequency, time and/or space, the present invention permits system designers to define M-ary signal constellations within an N-dimensional space, thereby increasing the $d_{min}$ property of the resulting signal constellation. Furthermore, using conventional QAM encoding and decoding, the effective length of codes derived from such N-dimensional signal constellations may be increased, thereby improving the overall performance of the modulation scheme. What has been described above is merely illustrative of the application of the principles of the present invention. Other arrangements and methods can be implemented by those skilled in the art without departing from the spirit and scope of the present invention.

What is claimed is:

1. A method for communicating information, the method comprising the steps of:
   defining a signal constellation comprising symbols, each of the symbols uniquely defined within an N-dimensional space, wherein N is at least three;
   allocating coordinates of the N-dimensional space into a plurality of groups, wherein each group comprises a subset of N orthogonal functions, and wherein at least one group comprises a plurality of orthogonal functions;
   encoding at least a portion of the information in accordance with the plurality of groups of the signal constellation to provide at least one encoded information symbol; and
   transmitting the at least one encoded information signal based on N orthogonal functions to provide transmitted information.

2. The method of claim 1, further comprising steps of:
   receiving the transmitted information;
   determining received symbols based on the transmitted information and the N orthogonal functions; and
   decoding the received symbols to provide received information.

3. The method of claim 1, further comprising steps of:
   providing data;
   encoding the data to provide encoded data having structured memory incorporated therein; and
   providing the encoded data as the information.

4. The method of claim 1, wherein the signal constellation is defined such that a minimum distance between the symbols is maximized.

5. The method of claim 1, wherein the symbols of the signal constellation reside upon an N-dimensional sphere.

6. The method of claim 1, wherein the N orthogonal functions are one of: N orthogonal spreading codes, N orthogonal time slots, N orthogonal antenna beams and N orthogonal complex sinusoidal carriers.

7. The method of claim 6, wherein the N orthogonal complex sinusoidal carriers are subcarriers within an orthogonal frequency division multiplexing encoder.

8. The method of claim 1, wherein the step of transmitting further comprises wirelessly transmitting the at least one encoded information symbol.

9. The method of claim 8, wherein the step of transmitting further comprises transmitting the at least one encoded information symbol using diversity transmission.

10. The method of claim 1, wherein each symbol is represented by N coordinates, the method further comprising steps of:
    for each of the at least one encoded information symbol, forming QAM symbols based on the N coordinates; and
    transmitting the QAM symbols based on the N orthogonal functions.

11. A method for communicating information, the method comprising the steps of:
    receiving transmitted information;
    determining at least one received symbol based on the transmitted information and N orthogonal functions used to transit the transmitted information, each of the at least one received symbol based on a signal constellation comprising symbols defined within an N-dimensional space, wherein N is at least three, wherein coordinates of the N-dimensional space are associated with a plurality of groups, wherein each group comprises a subset of N orthogonal functions, and wherein at least one group comprises a plurality of orthogonal functions; and
    in accordance with the plurality of groups, decoding the at least one received symbol to provide received information.

12. The method of claim 11, wherein the received information has structured memory incorporated therein, the method further comprising a step of:
    decoding the received information based on the structured memory of the received information to provide received data.

13. The method of claim 11, wherein the signal constellation is defined such that a minimum distance between the symbols is maximized.

14. The method of claim 11, wherein the symbols of the signal constellation reside upon an N-dimensional sphere.

15. The method of claim 11, wherein the N orthogonal functions are one of: N orthogonal spreading codes, N orthogonal time slots, N orthogonal antenna beams and N orthogonal complex sinusoidal carriers.

16. The method of claim 15, wherein the N orthogonal complex sinusoidal carriers are subcarriers within an orthogonal frequency division multiplexing encoder.

17. The method of claim 11, wherein the step of receiving further comprises wirelessly receiving the transmitted information.

18. The method of claim 17, wherein the step of receiving further comprises receiving the transmitted information using diversity reception.

19. The method of claim 11, wherein each symbol is represented by N coordinates, the step of decoding further comprising steps of:
for each of the at least one received symbol, performing QAM demodulation to provide QAM symbols; and
decomposing the QAM symbols to provide sets of N-tuple coordinates;
decoding the sets of N-tuple coordinates in accordance with the signal constellation to provide the received information.

20. A communication device for communicating information, the communication device comprising:
a symbol encoder that takes as input at least a portion of the information and provides as output at least one encoded information symbol in accordance with a signal constellation comprising symbols uniquely defined within an N-dimensional space, wherein N is at least three, wherein coordinates of the N-dimensional space are associated with a plurality of groups, wherein each group comprises a subset of N orthogonal functions, and wherein at least one group comprises a plurality of orthogonal functions; and
a transmitter that transmits the at least one encoded information symbol based on N orthogonal functions to provide transmitted information in accordance with the plurality of groups.

21. The communication device of claim 20, further comprising:
a data source providing data; and
a structured memory encoder that encodes the data to provide encoded data having structured memory incorporated therein,
wherein the encoded data is provided as the information.

22. The communication device of claim 20, wherein the signal constellation is defined such that a minimum distance between the symbols is maximized.

23. The communication device of claim 20, wherein the symbols of the signal constellation reside upon an N-dimensional sphere.

24. The communication device of claim 20, wherein the N orthogonal functions are one of: N orthogonal spreading codes, N orthogonal time slots, N orthogonal antenna beams and N orthogonal complex sinusoidal carriers.

25. The communication device of claim 24, wherein the N orthogonal complex sinusoidal carriers are subcarriers within an orthogonal frequency division multiplexing encoder.

26. The communication device of claim 20, wherein the transmitter further comprises a wireless transmitter.

27. The communication device of claim 26, wherein the transmitter further comprises a diversity transmitter.

28. The communication device of claim 20, wherein each symbol is represented by N coordinates, further comprising:
a QAM modulator that takes as input the at least one encoded information symbol and, for each of the at least one encoded information symbol, forms QAM symbols based on the N coordinates,
wherein the QAM symbols are transmitted based on the N orthogonal functions.

29. A communication device comprising:
a receiver for receiving transmitted information;
a demodulator for determining at least one received symbol based on the transmitted information and N orthogonal functions used to transmit the transmitted information, each of the at least one received symbol based on a signal constellation comprising symbols defined within an N-dimensional space, wherein N is a least three, wherein coordinates of the N-dimensional space associated with a plurality of groups, wherein each group comprises a subset of N orthogonal functions, and wherein at least one group comprises a plurality of orthogonal functions; and
a decoder that takes as input the at least one received symbol and provides received information as output in accordance with the plurality of groups.

30. The communication device of claim 29, wherein the received information has structured memory incorporated therein, the communication device further comprising:
a structured memory decoder that decodes the received information based on structured memory incorporated into the received information to provide received data.

31. The communication device of claim 29, wherein the signal constellation is defined such that a minimum distance between the symbols is maximized.

32. The communication device of claim 29, wherein the symbols of the signal constellation reside upon an N-dimensional sphere.

33. The communication device of claim 29, wherein the N orthogonal functions are one of: N orthogonal spreading codes, N orthogonal time slots, N orthogonal antenna beams and N orthogonal complex sinusoidal carriers.

34. The communication device of claim 33, wherein the N orthogonal complex sinusoidal carriers are subcarriers within an orthogonal frequency division multiplexing encoder.

35. The communication device of claim 29, wherein the receiver further comprises a wireless receiver.

36. The communication device of claim 35, wherein the receiver further comprises a diversity receiver.

37. The communication device of claim 29, wherein each symbol is represented by N coordinates, the decoder further comprising:
a QAM demodulator that takes as input the at least one received symbol and, for each of the at least one received symbol, provides QAM symbols and decomposes the QAM symbols to provide sets of N-tuple coordinates,
wherein the decoder decodes the sets of N-tuple coordinates in accordance with the signal constellation to provide the received information.

38. The method of claim 1, wherein the step of transmitting the at least one encoded symbol utilizes P antennas, and wherein P is less than N.

39. The communications device of claim 20, wherein the transmitter utilizes P antennas to transmit the at least one encoded information symbol, and wherein P is less than N.

40. The method of claim 1, wherein said each of the symbols corresponds to an orthogonal frequency division multiplexing (OFDM) symbol.

41. The method of claim 11, wherein the at least one received symbol corresponds to at least one orthogonal frequency division multiplexing (OFDM) symbol.

42. The communication device of claim 20, wherein the at least one encoded information symbol corresponds to at least one orthogonal frequency division multiplexing (OFDM) symbol.

43. The communication device of claim 29, wherein the at least one received symbol corresponds to at least one orthogonal frequency division multiplexing (OFDM) symbol.

* * * * *